: 3,049,466
METHOD OF BONDING FIBROUS STRUCTURES MADE FROM FIBERS OR FILAMENTS OF POLYOLEFINE POLYMERS
Victor L. Erlich, New York, N.Y., assignor to Reeves Brothers, Inc., New York, N.Y., a corporation of New York
No Drawing. Filed Apr. 23, 1957, Ser. No. 654,462
8 Claims. (Cl. 156—334)

This invention relates to an improved method for bonding fabric or other fibrous structures made of poly-alpha-olefine polymers. The method is applicable to the treatment of fibrous structures that are already produced, such as fabric, to impart to them a desirable characteristic like sealing, stabilization, or stiffening; and it is also applicable to structures that are in the process of being made in order to complete them, as in the production of bonded fiber fabrics.

More particularly, the method involves bonding fabric fibers of a polyolefine polymer at the points where the fibers cross other fibers, it being understood that the term fabric fibers refers to the constituent fibers of a structure which may be either produced or is in course of production. For example, two fabrics formed of filaments of a polyolefine polymer may be joined together by connecting a surface of one to a surface of the other to form a single unit of greater thickness than the individual fabrics. In the step of joining the fabrics, the constituent filaments or yarns of one fabric are bonded by aid of heat and a bonding agent to those of the other fabric at the points where they are in contact, i.e., where they cross.

Heretofore, the bonding of two such fabrics as described by heat sealing them has not been possible because the heating of the fabrics to the required high temperatures caused undesirable changes in the physical and mechanical properties of the fabric; thus, shrinkage occurred which produced unwanted deformation of the constituent filaments or yarns of the fabric. Furthermore, in fabrics made from oriented filaments, the high temperatures also affected the orientation of the polymer molecules so as to reduce or destroy the strength of the constituent filaments or yarns and of course of the fabric incorporating them.

When adhesives are used to bond together a pair of fabrics, in the case of fabrics made from polyolefine polymers, these polymers are so inert to chemical attack that the adhesives do not provide a quick, strong, and non-tacky bond. Finding a suitable adhesive has been a difficult problem, and the difficulty is increased by the fact that the surface to be bonded by the adhesive is limited in area, being established as that of an individual constituent filament or yarn of the fabric.

The instant invention provides a method which avoids the difficulties mentioned in that it enables the fabric or other structure to be heated to lower temperatures than heretofore such that the fabric or its component filaments or yarns are not impaired. It further provides for the use of a practical and effective bonding agent, and for the joint use of such agent and heat. Generally, the method contemplates the bonding of fabric fibers by heat sealing them at their intercrossings, and it comprises applying to fibers of a poly-alpha-olefine polymer a bonding agent which also comprises a poly-alpha-olefine polymer which has the same or a related chemical composition as the fibers polymer but which has a melting point at least 25° C. below that of the polymer of the fibers. The fibers so treated are then subjected to heat treatment at a temperature intermediate that of the melting points of the polymer of the fibers and of the agent. This temperature is sufficiently high to fuse substantially all of the polymer of the agent but to soften or fuse only the surfaces of the fibers. The fused agent coalesces with the softened or fused fiber surfaces, and after cooling, these once fused and softened portions harden to form strong and permanent bonds between the fibers at their intercrossings.

It will be understood that after coalescing has occurred, the fibers will be cooled to avoid a softening or fusing action on any part of them other than their surfaces.

As may be apparent, by employing as the bonding agent a material which fuses at a lower temperature than the fibers polymer, impairment of the fibers can be avoided; by employing a bonding agent material which fuses not far below the melting point of the fibers polymer, enough heat can be supplied to cause the surfaces of the fibers to soften or fuse; and finally, by requiring the agent material to have the same or a related chemical composition as the fibers polymer, rapid coalescing of the fused agent and the softened or fused fiber surfaces is promoted because of the mutual chemical compatibility between the two polymers.

Considering the invention in detail, the physical form of the fibrous structure may be any of those usually found in the textile field. Thus, the invention may be applied to join together a pair of fabrics of any type or kind, including woven fabric; non-woven fabric such as knitted, netted, braided and felted fabrics; or structures made by twisting yarns or fibers, such as rope, cord and twists.

The invention is applicable to stabilizing the foregoing structures by imparting anti-slip characteristics to their constituent fibers, filaments or yarns, this procedure being particularly useful in the case of fabrics made of smooth fibers such as monofilaments in a more or less open weave. Such fabrics usually are extremely unstable because the filaments have a tendency to slip at or over their intercrossings, and deformations of the fabric can occur which make them completely unusable. After treatment by the present method, a stable fabric is obtained without changing its physical properties or its appearance.

Another sometimes desirable effect of the foregoing applications is a stiffening of the fabric or other structure.

The invention is also useful for the production of so-called non-woven or bonded fiber fabric, which, as conventionally made, comprises layers of non-continuous, randomly distributed, short length fibers bonded together by means of various adhesives or latices.

As noted, the polymer material from which the fibrous structure is made is a polyolefine, which may be defined as a synthetic, polymeric, thermoplastic, fiber-forming material made by polymerizing a low molecular weight aliphatic olefine such as ethylene, propylene, isobutylene, butene-1, 3-methyl-butene-1, and the like to produce polymers respectively designated polyethylene, polypropylene, polyisobutylene, polybutene, poly-3-methylbutene-1, etc. Other materials are made by copolymerizing ethylene with an olefine like propylene or butene-1. The polyolefines may vary with respect to one another in such properties as melting point, molecular weight, density and molecular structure; depending on the molecular weight and the molecular structure, the softening and melting points differ widely. Variations may also be present among polymers of the same chemical kind, sofetimes designated homopolymers, as for example in the case of polyethylene.

In connection with polyethylene, it may be observed that it can have a practically straight chain molecular structure or a more or less branched molecular structure, and although the physical properties of these two types may differ, chemically they have practically the same characteristics. Both are referred to as polyethylene or ethylenic polymers, and the substantially straight chain material is sometimes referred to as polymethylene. The partly branched chain material may have molecular weights from about 15,000 to 30,000, while the substantially straight chain material may have molecular weights ranging upwardly to several hundred thousand. Polyethylene has fiber-forming properties at molecular weights of approximately 15,000 and up.

Polypropylene, polybutene, etc. may have structures similar to polyethylene and are also referred to as ethylenic polymers.

Some typical fiber-forming polyolefines and their properties are listed below as Nos. 2–6 of Table 1.

The polymer of which the bonding agent is formed is also a polyolefine of the kind described, except that it need not necessarily be a fiber-forming material. The agent polymer should have a melting point of at least 25° C., preferably more, below that of the polymer of which the fabric fibers or filaments to be treated are made. Illustrative agent polymers and their properties are as follows:

TABLE 1

| No. | Polymer | Molecular Structure or Type | Density | Estimated Average Mol. Weight | Melting Range, ° C. |
|---|---|---|---|---|---|
| 1 | Polyethylene | branched | 0.92 | 1,000 to 2,000 | 85 to 95. |
| 2 | do | do | .92 | 19,000 to 20,000 | 110 to 115. |
| 3 | do | do | .92 | 23,000 to 25,000 | 120 to 125. |
| 4 | do | do | .94 | 25,000 to 30,000 | 125 to 135. |
| 5 | do | linear | .95 to .96 | 50,000 to 100,000 | 135 to 145. |
| 6 | Polypropylene | isotactic | .83 to .90 | 100,000 to 200,000 | 165 to 180. |

Nos. 2–6 are useful polymers from which to form the fabric filaments; No. 1 is not suitable for such purposes because it is not a fiber-forming material. However, No. 1 is useful for the bonding agent, since the difference in melting point between it and any of the other polymers is 25° C. or more. Thus, if No. 2, 3, 4, 5 or 6 was used to make the fabric filaments, No. 1 could be taken for the bonding agent. Similarly, No. 2 could form the agent for fabric filaments made of No. 5 or 6, and No. 3 or 4 could be the agent for fabric filaments formed of No. 6.

Another fiber-forming material is the polymer of 3-methyl-butene-1; in its isotactic form it has a density of about 0.90 and a melting point in the vicinity of 245° C. It is suitable for use with bonding agent polymers of higher melting point.

Another bonding agent polymer is polyisobutylene having a molecular weight in the range of 80,000 to 120,000; although this material has no pronounced or determined melting point or melting melting point range, it softens so as to be a useful bonding agent at temperatures which permit its use with fabric filaments made from at least some of the above polymers.

The bonding agent may comprise a single polymer, as illustrated in the table, or it may be a blend of two or more polymers. The use of blends can provide a bonding agent having a desirably lower melting point and which may advantageously possess some tackiness. As an example, compounding 80% polyethylene (No. 2 of Table 1) with 20% polyisobutylene of a molecular weight of 80,000 will give a blend whose melting point range is reduced over that of the polyethylene by approximately 10° C., and a 60:40 blend of the same two polymers provides a decrease in the melting point range of approximately 25° C. Blends such as those of polyethylene-polyisobutylene compounds improve the bonding process because they have a certain degree of tackiness which increases with the amount of polyisobutylene present in the blend. In addition to blends, copolymers such as those of ethylene with up to 15% or so of propylene or butylene may serve as bonding agents and may also provide reduced melting points.

The quantity of the bonding agent applied to the surface of the polyolefine filaments should be only sufficient to form enough of the melting agent to provide a permanent bond at each intercrossing of the filaments or fibers; in other words, an excess is not desirable. Such amount of agent is readily determinable in a given case and is small by comparison with the weight of the filaments to be treated.

During application, the bonding agent may be in the form of a solution in an organic solvent or an aqueous dispersion.

Solutions of the agent polymer, particularly polymers of lower melting point, may be formed in such solvents as carbon tetrachloride or other chlorinated hydrocarbons, and in non-polar compounds like aromatic hydrocarbons. Preferably the solvent is one that boils below the melting point of the agent polymer so as to facilitate its later removal by evaporation. Solution may be effected at about 60° C., at which temperature about a 10% solution may be formed, which is a practical concentration. At higher temperature, going up to the softening point of the agent polymer, solutions of higher concentration may be formed. An advantage of the use of solutions is that because of their good adherence they tend to facilitate the bonding at the intercrossings. Owing to the swelling and softening effect of the solvent on the fiber surface, due care must be exercised to avoid weakening the other parts of the fiber surface where no bonding action is needed or desired.

Preferably the agent is applied as an aqueous dispersion, which can be prepared in concentrations as high as 50 or 60% of the agent polymer and at any desired lower concentration. The dispersions are conventionally prepared and may contain appropriate dispersing agents and emulsion stabilizers such as, for example, stearic acid, 2-amino-2-methyl-1-propanol, "Nopcogen 14L" which is a cationic type agent, "Anmac T," and others. Dispersions are advantageous because they afford a wider range and higher level of concentration, they are applicable to fibrous structures at room temperatures, they are easier to handle, and they are less expensive. The adherence of the dispersion to the fiber surfaces is primarily a mechanical one, and the major part of the dispersion assembles and remains at the intercrossings, as is desirable.

In some instances the agent may also be usefully applied in the form of a dry powder, as in the production of non-woven fabrics.

For illustrative purposes the stabilization treatment of a fabric will be considered in connection with the manipulative steps of the method.

The application of the bonding agent, either in solution or dispersion form, can be done in conventional equipment by dipping or padding the fabric into the liquid or by brushing or spraying the liquid onto the surface of the fabric.

Following application, small quantities of the liquid remain adherent to the surfaces of the fibers or filaments; and after removal of the solvent, or draining of the water, as the case may be, a certain amount of the bonding agent remains finely dispersed on said surfaces.

The treated fabric is then dried and subjected to the actual bonding by heat treatment. The fabric is submitted to a temperature which is intermediate that of the melting points of the agent and fabric polymers, this temperature being sufficiently high to fuse substantially all of the agent polymer and to soften or fuse only the surfaces of the fibers or filaments of the fabric. Numerically, the temperature is 10 to 20° C., preferably 20° C., above the melting point of the bonding agent polymer but is still at least 10° C., and preferably 20° C., below the melting point of the fabric polymer. The heating can be done in drying chambers, as by running the fabric therethrough on continuous belts or tenter frames. Another practical method is to run the fabric over adequately heated metal rolls, having some provision to avoid contamination of the roller surface by the bonding agent. In some instances it may be advantageous to combine the preliminary drying with the heating operation; that is, the steps may be carried out consecutively in the same equipment.

The duration of the heating should be sufficient to produce the desired bonding action without damaging the fabric. The duration will vary depending on the fabric or other structure being treated and on the particular polymers involved; however, it can be determined in any given case. Illustrative heating times appear in the examples that follow.

At the conclusion of the heating step the fabric is cooled without delay. Cooling may be effected in any suitable manner, as by moving the fabric into a stream of cold air, cold water, and the like. It is desirable to reduce the fabric temperature to below 60° C. before moving it from the cooling zone.

As a result of the heating, the bonding agent polymer melts and subsequently the higher melting point polymer of the fabric starts to soften or melt on the surfaces of the fibers thereof. The melted agent coalesces or fuses with the softened or fused fiber surfaces, an action aided by the application of light pressure on the fabric, and upon cooling, the coalesced portions harden to form a strong and permanent bond at each fiber intercrossing. In other words, a bond joins each pair of intercrossed fibers at each crossing point. Because softening and melting occurs only at the fiber surfaces of the fabric, there is practically no deformation or loss of strength of the fabric or of its constituent fibers or yarns.

In some instances the bonded fabric, after cooling, may be run through mechanical cleaning devices in order to eliminate particles of the dry bonding agent which may not be well adhered to the fiber surfaces, particularly removable particles disposed where no intercrossings are located and where, therefore, a bonding action is not needed. Other finishing operations, for instance calendering to smoothen surfaces, can be applied without affecting the bonds obtained at the intercrossings.

The above described manipulative steps are also useful for stabilizing other produced or completed structures or joining together a pair of completed structures. In joining a pair of structures such as fabric, the bonding agent is applied to a surface of each fabric after which one fabric is imposed over the other to overlap them and so as to bring the agent-treated surfaces into contact with each other. The overlapped fabrics can then be heated while pressing them together to maintain contact, the above described belts or tenter frames being suitable for this purpose.

In the case of bonded fiber fabrics, since ordinary adhesives or latices are unsuitable when the fibers to be bonded are made of a polyolefine polymer, owing to the extreme inertness of the polymer to chemical attack and the consequent weakness of the bond obtained, the present method can be advantageously employed to produce a well bonded, strong fabric of this type. Several procedures are suitable for the application of the method. In one of these, the randomly distributed fibers in short lengths can be placed upon a metal sheet or fine metal screen to form layers of variable thickness, and onto these layers the lower melting, finely dispersed polyolefine polymer bonding agent can be applied by spraying it in the form of a solution or water dispersion. The thus wetted fiber mat is then dried, heat treated, and cooled as described above to form a strongly bonded fabric.

In a second procedure, a so-called parallel warp or weftless fabric is first placed on the metal sheet or screen and the cut fibers are distributed over it, the subsequent steps being the same as in the preceding operation. The parallel warp is formed of continuous monofilaments of the same polymer as that of the cut fibers.

In a third modification, instead of employing a solution or dispersion of the bonding agent as in the preceding variations, it can be used in the form of a finely ground dry powder which can be mixed with the fibers prior to forming them into layers. It is an advantage to add small amounts of wetting agents to the fibers or the powder. The steps following can proceed as in the other alternatives.

In another modification, the cut fibers are made from a polyolefine polymer of high melting point, such as polypropylene, and the lower melting bonding agent polymer is chosen from a polyolefine of a molecular weight sufficiently high as to be itself fiber-forming, such as polyethylene of a molecular weight in the range of say 16,000 to 19,000. The bonding agent may be used in solution, dispersion, or powder form, as described above, and the operation suitably completed in accordance with one of the previous alternatives. When the powdered form is desired, it is practical to make it by grinding fibers of the lower melting polymer, because such ground fibers, or particles, tend to have a rod-like shape by virtue of which losses in handling the fiber layers, which could otherwise occur when using powder comprising particles of more or less round form, can be avoided.

Another procedure comprises adding to the cut fibers an amount of one or more other fibers in staple form made from non-polyolefine polymer material such as cotton, rayon, nylon, acrylics and others. This can be desirable to impart to the final fabric such properties as hygroscopicity, warmth, and flexibility. If the amount of such addition remains below 50% by weight of the total fiber mixture, the method of processing will be the same as the procedures described above and the basic character of the fabric product will be that of a polyolefine polymer fabric.

As may be apparent, the present method is capable of producing bonded fiber or non-woven type fabrics having a wide variety of properties with regard to thickness, rigidity, permeability, and even of hydroscopicity, as may be desirable for different end uses.

The following examples may illustrate the invention, Examples 1–3 showing fabric stabilization, and Examples 4–6 the production of bonded fiber fabrics.

*Example 1*

A fabric was woven from round monofilaments having a diameter of 0.006 inch prepared from a linear type polyethylene having a melting point on the level of 130° C. The fabric had a plain weave, a construction of 15 filaments in the warp direction and 15 filaments in the filling direction, and was unusable for many purposes because of its mechanical instability caused by the slippage of the smooth filaments at their intercrossings. This fabric, placed on rolls and a tenter frame, was pulled through a padding bath composed of a water dispersion of a low melting polyethylene of a molecular weight between 1,000 and 2,000. This polymer, which corresponds to No. 1 of Table 1, had a melting point of 85 to 95° C. The dispersion had a polymer content of 20% by weight. The fabric, with liquid adhering mainly to the intercrossings, was then subjected to hot air drying during slow forward movement, and subsequently introduced into an oven chamber held at a temperature of 110° to 112° C. by circulating hot air. The fabric was kept in the oven over a period of between 10 and 15 minutes, followed which its forward movement was continued over rolls into cooling air to the point of complete solidification of the bonds at the filament crossing points. The resulting fabric was firm, with the filaments strongly attached to each other at the intercrossings. It was somewhat stiffened, but the degree of stiffening was controllable by changing the concentration of the polyethylene in the dispersion.

*Example 2*

A fabric woven with monofilaments of the same origin as in Example 1 but of a diameter of 0.015 inch, and woven in twill weave at the count of 12 filaments in the warp direction and 11 filaments in the filling direction, was padded in a water dispersion having 30% by weight polymer content, the latter consisting of three parts polyethylene of the type used as bonding agent in Example 1 and one part polyisobutylene of a molecular weight of about 80,000. After processing as described in Example 1, a solidly bonded and flexible fabric was obtained.

*Example 3*

A fabric of a loose construction similar to that described in Example 1 but woven filaments of polypropylene having a melting point of around 165° C. was padded in a 30% by weight water dispersion of polyethylene having a melting point of 110 to 115° C. and a molecular weight of approximately 19,000. The two polymers correspond to Nos. 6 and 2, respectively of Table 1. After drying, the fabric was treated at a temperature of 130° C. over a period of between 5 and 10 minutes. The resulting fabric was firmly bonded in its intercrossings.

*Example 4*

A mixture of filaments were extruded without ensuing orientation from polyethylene of medium density having a melting point of between 120 and 125° C. A variety of diameters were produced ranging from 0.0015 to 0.004 inch. The filaments were cut to short staple lengths ranging from one-fourth to one inch, and these were immersed in a trough containing a 20% by weigh water dispersion of a mixture of 60% polyethylene of the type used as bonding agent in Example 1 and 40% polyisobutylene of 80,000 molecular weight. The mixture of fibers and dispersed, low melting bonding agent polymers was mixed and spread onto the surface of a stainless steel screen having openings of one-sixteenth inch. The screen was driven as an endless belt in slow forward movement. Excess liquid was permitted to drip through the screen holes, leaving on the screen or belt a wet fiber mat the thickness of which was adjusted to approximately one-fourth inch by a horizontally located blade. The moving belt then entered a drying zone where most of the water was evaporated by hot air streams. The moving mat was then passed below a second moving belt, comprising a perforated stainless steel sheet, and moving at the same forward speed as the first or lower belt. The moving mat became engaged between the second or upper belt and the lower belt, the upper belt being forced by pressure rolls onto the fiber surface so as to gradually reduce the mat thickness to one-sixteenth inch. This pressure on the fiber mat was maintained during the ensuing bonding operation, which was carried out in an oven chamber at a temperature between 110 and 115° C. After leaving the oven, the belts with the fiber mat engaged between them were moved into a cold air stream to reduce the temperature to below 60° C. The belts were then separated to permit detachment of the fiber mat, now solidly bonded together, and it was recovered on rotating drums. The thickness as well as the strength of the produced non-woven fabric was controllable by changing the conditions with regard to the concentration of the water dispersion on one hand, and the horizontal, mat-depressing blade on the other hand.

*Example 5*

Polypropylene having a melting point of around 165° C. was extruded to only partly oriented filaments in a variety of diameters ranging from 0.001 to 0.003 inch. They were cut to short staple lengths of between one- fourth and three-fourths inch; and the resulting fibers were tumbled with a fine powder comprising polyethylene of 0.92 density and a melting point on the level of 110° C. in a ratio of ten parts fiber to one part powder. To obtain the powder, thin filaments previously extruded from this low melting polyethylene were ground in a cutting-grinding machine to fine particles having a rod-like shape and resembling very short fibers not more than one-sixteenth inch in length. These particles were more suitably retained in the dry fiber-powder mixture than round particles. The dry mixture was then spread upon a moving metal screen as described in Example 4. A small amount of dimethylene glycol was added to the mixture to serve as a wetting agent. No air drying was required. The mixture was formed into a layer by means of the belts described in the preceding example and was subjected to the bonding operation at a temperature of 135° to 140° C. to produce, after cooling, a firmly bonded non-woven fabric. Its strength and flexibility could be controlled as desired by decreasing or increasing the amount of powder added to the fibers.

*Example 6*

Polypropylene of a melting point of around 165° C. was extruded to oriented high tenacity monofilaments of 0.006 inch diameter. These were laid out in continuous length to form a "parallel warp" having 140 filaments per inch and collected on a roll. This warp was pulled over rolls onto an endless belt comprising a stainless steel open mesh screen. Polypropylene staple fibers of the kind described in Example 5 were blended in a ratio of 7 parts of such fibers to 3 parts of long staple rayon fibers. One part of finely ground powder of low melting polyethylene, as in Example 5, was added to this blend, the mixture tumbled, then spread onto the surface of the parallel warp, and then processed in a manner similar to that described in Example 5. During the movement of the layer through the oven chambers, the warp was held under restraint in the direction of the forward movement to prevent undue shrinkage and deformation of the monofilaments. The resulting fabric was characterized by particularly high strength in the warp direction and by a certain amount of moisture regain due to the hygroscopicity of the added rayon fiber firmly bonded into the thermoplastic fabric. The term "filamentous strands" is intended to cover the constituent filaments or yarns of a fabric. The term "fibers" is intended to cover long or continuous filaments as well as short length filaments.

In the light of the foregoing description, the following is claimed:

1. In a method of bonding fabric fibers by heat sealing them at their intercrossings, the improvement which comprises applying to fibers of a poly-alpha-olefine polymer a bonding agent consisting essentially of a poly-alpha-olefine polymer having its chains different in molecular structure from those of the fiber polymer and having a permanent melting point at least 25° C. below that of the polymer of said fibers, then subjecting said fibers to heat treatment at a temperature intermediate that of the melting points of the polymer of said fibers and of said agent, said temperature being sufficiently high and maintained for a sufficient length of time to fuse substantially all of the polymer of said agent and to soften or fuse only the surfaces of said fibers, whereby said agent becomes sufficiently fluid to enable the major portion thereof to accumulate at the intercrossings and to coalesce with said fiber surfaces at said intercrossings, and cooling the fibers to harden said fused and softened portions to form bonds between said fibers at said intercrossings.

2. In a method of joining together a pair of fabrics each made of constituent filamentous strands of a poly-alpha-olefine polymer wherein the strands of one fabric cross the strands of the other fabric at a plurality of crossing points; and wherein the strands of said fabrics are bonded at said crossing points, the improvement comprising applying to a surface of each fabric a bonding agent consisting essentially of a poly-alpha-olefine polymer having its chains different in molecular structure from those of the strand polymer and having a permanent melting point at least 25° C. below that of the polymer of said strands, then imposing one fabric over the other to overlap them and so as to bring said agent-treated surfaces into contact with each other, subjecting the overlapping fabrics to heat treatment at a temperature intermediate that of the melting points of the polymer of said strands and of said agent while pressing the fabrics together to maintain contact, said temperature being sufficiently high and maintained for a sufficient length of time to fuse substantially all of the polymer of said agent and to soften or fuse only the surfaces of said strands, whereby said agent becomes sufficiently fluid to enable the major portion thereof to accumulate at the intercrossings and to coalesce with said strand surfaces at said intercrossings, and cooling the fabrics to harden said fused and softened portions to form bonds between said strands at said crossing points.

3. In a method of bonding fabric fibers to produce a bonded fiber fabric wherein said fibers are disposed in the form of layers and bonded together at their crossing points, the improvement comprising applying to fibers of a poly-alpha-olefine polymer a bonding agent consisting essentially of a poly-alpha-olefine polymer having its chains different in molecular structure from those of the fiber polymer and having a permanent melting point at least 25° C. below that of the polymer of said fibers, subjecting the fibers to heat treatment at a temperature intermediate that of the melting points of the polymer of said fibers and of said agent, said temperature being sufficiently high and maintained for a sufficient length of time to fuse substantially all of the polymer of said agent and to soften or fuse only the surfaces of said fibers, whereby said agent becomes sufficiently fluid to enable the major portion thereof to accumulate at the inter-crossings and to coalesce with said fiber surfaces of said intercrossings, and cooling the fibers to harden said fused and softened portions to form bonds between said fibers at said crossing points.

4. A method of bonding fabric fibers of a poly-alpha-olefine polymer at their intercrossings which comprises applying to said fibers a bonding agent consisting essentially of a poly-alpha-olefine polymer having its chains different in molecular structure from those of the fiber polymer and having a permanent melting point at least 25° C. below that of the polymer of said fibers, then heating said fibers to a temperature intermediate that of the melting points of said polymers while maintaining said fibers in contact with one another at said intercrossings, said temperature being sufficiently high and maintained for a sufficient length of time to fuse the polymer of said agent and to soften or fuse only the surfaces of said fibers, whereby said agent becomes sufficiently fluid to enable the major portion thereof to accumulate at the intercrossings and to coalesce with said fiber surfaces at said intercrossings, and cooling the fibers to harden said coalesced portions to form bonds between said fibers at said intercrossings.

5. The method of claim 4 in which said bonding agent comprises a blend of at least two polyolefine polymers.

6. In a method of bonding a fabric of open structure made of filamentous intercrossing strands of a poly-alpha-olefine polymer, wherein said fabric comprises a single layer structure characterized by a tendency of said strands to slip at their intercrossings, and wherein the strands are bonded at their intercrossings to prevent slipping, the improvement comprising so applying to a surface of said fabric an aqueous dispersion of a bonding agent consisting essentially of a poly-alpha-olefine polymer having its chains different in molecular structure from those of the strand polymer and having a permanent melting point at least 25° C. below that of the polymer of said fabric, said bonding agent polymer being entirely chemically compatible with said fabric polymer, as to cause a major portion of said dispersion to collect at said intercrossings, subjecting the fabric to heat treatment at a temperature intermediate that of the melting points of the polymers of said fabric and of said agent, said temperature being sufficiently high and maintained for a sufficient length of time to fuse substantially all of the polymer of said agent and to soften or fuse only the surfaces of said strands, whereby said fused agent becomes sufficiently fluid to enable said major portion thereof to coalesce with said strand surfaces at said intercrossings, cooling the fabric to harden said fused and softened portions to form bonds between said strands at the intercrossings thereof, and obtaining as product a fabric having non-slip constituent strands and whose physical appearance is otherwise the same as the original unbonded fabric, the amount of bonding agent being such that the open structure of the fabric is maintained.

7. In a method of joining together a pair of fabrics each made of filamentous strands of a poly-alpha-olefine polymer, wherein the strands of one fabric cross the strands of the other fabric at a plurality of crossing points, and wherein the strands of said fabrics are bonded at said crossing points, the improvement comprising so applying to a surface of each fabric an aqueous dispersion of a bonding agent consisting essentially of a poly-alpha-olefine polymer having its chains different in molecular structure from those of the strand polymer and having a permanent melting point at least 25° C. below that of the polymer of said fabrics, said bonding agent polymer being entirely chemically compatible with the polymer of said fabrics, as to cause a major portion of said dispersion to collect at said crossing points, then imposing one fabric over the other to overlap them and so as to bring said agent-treated surfaces into contact with each other, subjecting the overlapping fabrics to heat treatment at a temperature intermediate that of the melting points of the polymers of said fabrics and of said agent while pressing the fabrics together to maintain contact, said temperature being sufficiently high and maintained for a sufficient length of time to fuse substantially all of the polymer of said agent and to soften or fuse only the surfaces of said strands, whereby said fused agent becomes sufficiently fluid to enable said major portion thereof to coalesce with said strand surfaces at said intercrossings, and cooling the fabrics to harden said fused and softened portions to form bonds between said strands at said crossing points.

8. In a method of bonding fabric fibers to produce a bonded fiber fabric wherein said fibers are disposed in the form of layers and bonded together at their crossing points, the improvement comprising so applying to fibers of a poly-alpha-olefine polymer an aqueous dispersion of a bonding agent consisting essentially of a poly-alpha-olefine polymer having its chains different in molecular structure from those of the fiber polymer and having a permanent melting point at least 25° C. below that of the polymer of said fibers, said bonding agent polymer being entirely chemically compatible with said fibers polymer, as to cause a major portion of said dispersion to collect at said crossing points, subjecting the fibers to heat treatment at a temperature intermediate that of the melting points of the polymer of said fibers and of said agent, said temperature being sufficiently high and maintained for a sufficient length of time to fuse substantially all of the polymer of said agent and to soften or fuse only the surfaces of said fibers, whereby said fused agent becomes sufficiently fluid to enable said major portion thereof to coalesce with said fiber surfaces at said intercrossings, and cooling the fibers to harden said fused and softened portions to form bonds between said fibers at said crossing points.

References Cited in the file of this patent

UNITED STATES PATENTS

| | | | |
|---|---|---|---|
| 2,418,904 | Rugeley | Apr. 15, | 1947 |
| 2,431,303 | Billmeyer | Nov. 25, | 1947 |
| 2,476,282 | Castellan | July 19, | 1949 |
| 2,568,144 | Cremer et al. | Sept. 18, | 1951 |
| 2,628,172 | Jenett | Feb. 10, | 1953 |
| 2,676,128 | Piccard | Apr. 20, | 1954 |
| 2,765,247 | Graham | Oct. 2, | 1956 |
| 2,836,576 | Piccard et al. | May 27, | 1958 |